Oct. 16, 1934.　　　O. MUENSTER　　　1,977,006
SELF CLOSING STRAINER
Filed June 27, 1933　　　2 Sheets-Sheet 2
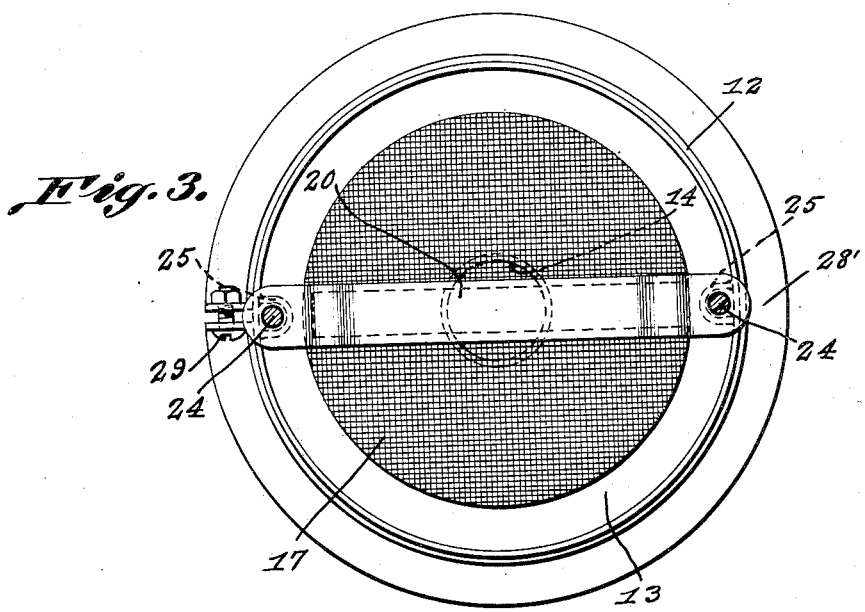
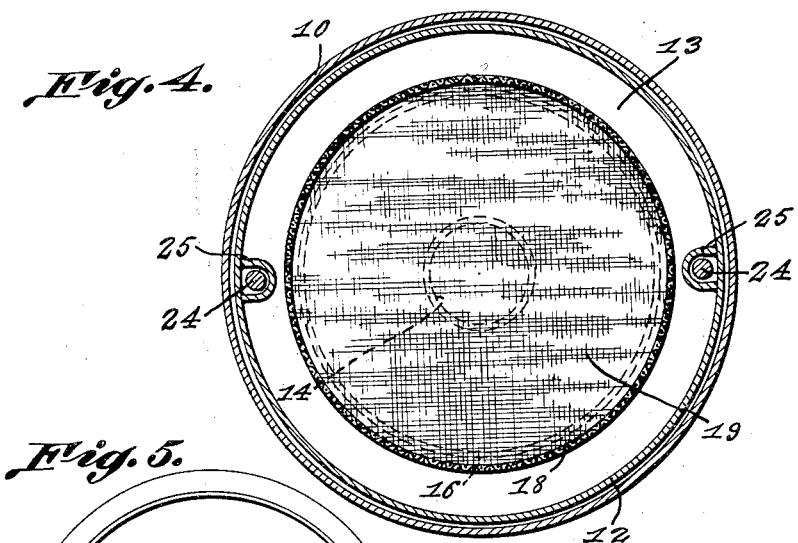
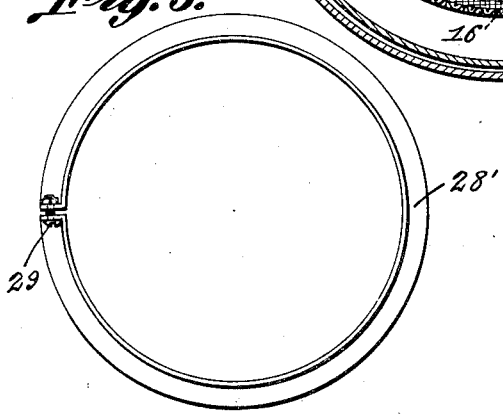
Otto Muenster, INVENTOR
BY Victor J. Evans & Co.
ATTORNEY Patented Oct. 16, 1934

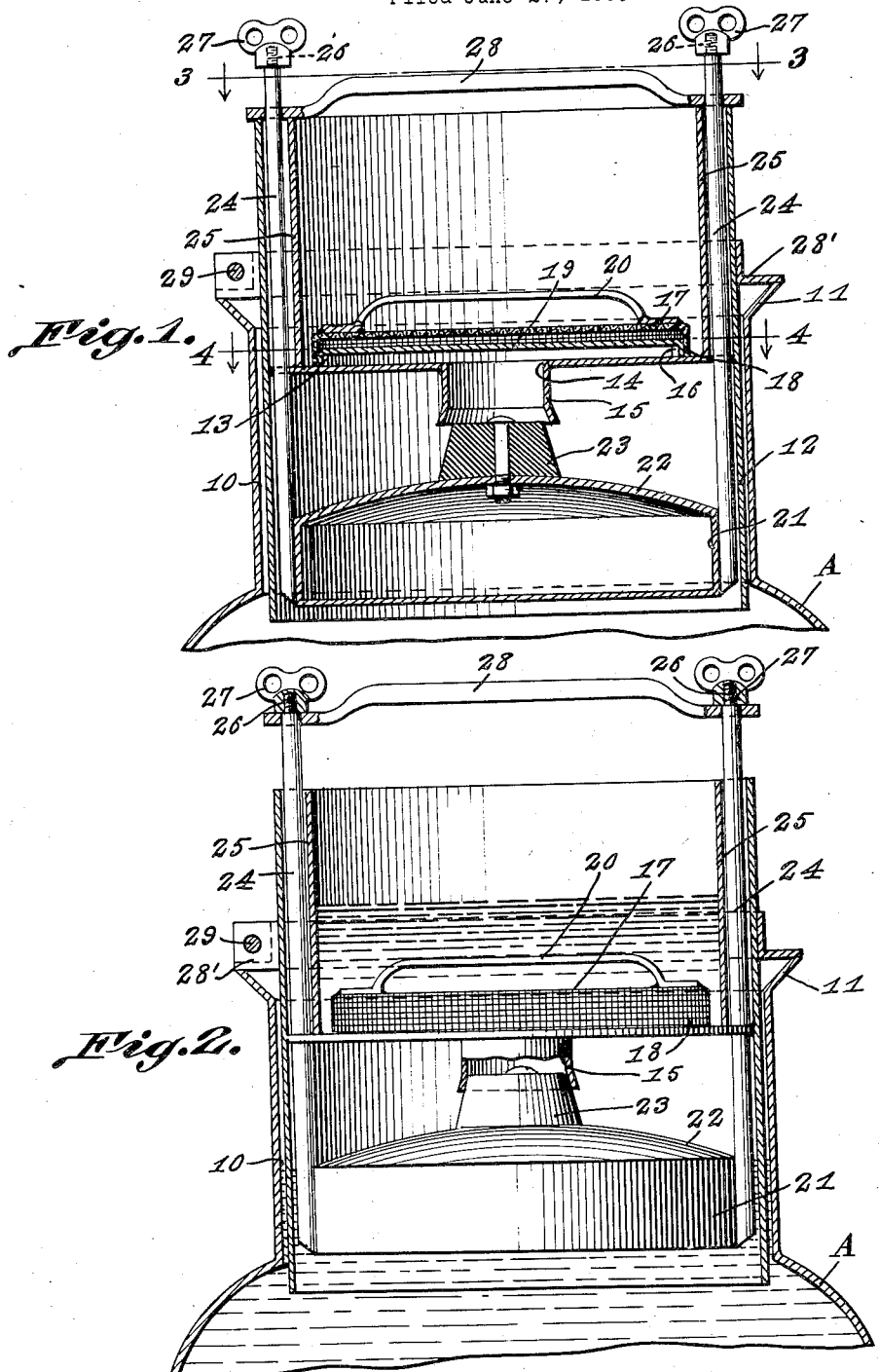

1,977,006

UNITED STATES PATENT OFFICE 1,977,006

SELF-CLOSING STRAINER

Otto Muenster, Green Bay, Wis.

Application June 27, 1933, Serial No. 677,905

1 Claim. (Cl. 210—156)

The invention relates to a strainer and more especially to a self-closing strainer.

The primary object of the invention is the provision of a strainer of this character, wherein the construction thereof is such as to permit the insertion within the mouth of a receptacle, such as a milk can or other container and when filling the latter the substance will be strained and when a determined level has been reached by the contents the flow of the substance will be shut-off, thereby avoiding the overflowing of such receptacle or container.

Another object of the invention is the provision of a strainer of this character, wherein by reason of its construction the same can be positioned within the mouth of a container so as to regulate the quantity of substance to be introduced therein, that is the height of such substance within the receptacle or container, the strainer being of novel construction and is automatic in its operation to avoid any possibility of the waste of the contents of the receptacle or container, because the flow thereinto will be shut-off at a determined period according to the set position of the strainer and the level of the contents.

A further object of the invention is the provision of a strainer of this character, wherein in its use the filling of receptacles or containers, such as milk cans, will be automatically controlled so as to avoid any possibility of overflow and resultant loss of milk or the like when introduced into the receptacle or container, the strainer being self-closing and is readily and easily inserted into the mouth or open end of the receptacle or container and will positively strain the liquid when introduced thereinto.

A still further object of the invention is the provision of a strainer of this character, which is comparatively simple in construction, thoroughly reliable and efficient in its purposes, strong, durable, readily and easily brought into place and removed with respect to a receptacle or container, and inexpensive to manufacture.

With these and other objects in view the invention consists in the feature of construction, combination and arrangement of parts as will be hereinafter more fully described in detail, illustrated in the accompanying drawings which disclose the preferred embodiment of the invention and pointed out in the claim hereunto appended.

In the accompanying drawings:

Figure 1 is a fragmentary vertical sectional view through a receptacle or container and the strainer constructed in accordance with the invention and in position in the mouth or open filling end of said receptacle or container.

Figure 2 is a view similar to Figure 1 showing the strainer in its self-closing position.

Figure 3 is a sectional view on the line 3—3 of Figure 1 looking in the direction of the arrows.

Figure 4 is a sectional view on the line 4—4 of Figure 1 looking in the direction of the arrows.

Figure 5 is a plan view of the setting ring for the strainer.

Similar reference characters indicate corresponding parts throughout the several views in the drawings.

Referring to the drawings in detail, A designates generally a portion of a container or receptacle, as for example, a milk can, having the filling mouth or open end 10 provided with an outwardly flared rim 11, this being of conventional form.

Insertable in and removable from the mouth or open end 10 of the receptacle or container A is the strainer constituting the present invention and comprising a cylindrical body 12 which may be of any required length. Within the body 12 at an intermediate location of the length thereof is a horizontal partition or shelf 13 having the center opening 14 bordered by an annular flange 15 which depends from the partition or shelf, as will be clearly apparent in Figure 1 of the drawings, and constitutes a stopper receiving mouth or seat.

At the upper side of the partition or shelf 13 is an annular rib 16 over which is removably fitted a strainer 17 of reticulated or foraminous sheet material, while clamped between the rib and the marginal edge 18 of the strainer 17 is a filtering fabric 19 which, by reason of its mounting, can be readily removed for cleaning purposes, this being also true with regard to the strainer 17. The strainer 17 has connected therewith a hand-hold 20 for convenience in placing the strainer 17 over the rib 16, the latter and the marginal edge 18 being circular and the latter concentric of the said rib 16.

Arranged beneath the partition or shelf 13 is a float or buoyant element 21 of less size than the interior diameter of the body 12. This float or buoyant element 21 has a convexed top 22 carrying centrally thereof a suitable fastener for the securing of an upwardly tapered resilient stopper 23 which is centrally aligned with the opening 14 formed by the flange 15, so that when the float or buoyant element 13 rises within the body 12 the stopper 23 will engage the mouth or seat constituted by the flange 15 to close the opening 14, as should be obvious. It is preferable to have the stopper 23 made from rubber or other resilient material to assure a perfect contact and for the positive closing of the opening 14 during the working of the strainer.

Suitably fixed with the float or buoyant element 21 at diametrically opposite sides are upstanding guide rods 24, which are freely slidable in guides 25 therefor and formed with the body 12 above the partition or shelf 13. The upper ends of these guide rods 24 are reduced and have threaded terminals 26 carrying winged nuts 27 which retain a handle 28 connected with said rods so that the float can be manually lifted or conveniently transported from one place to another, as well as for permitting the easy insertion in and removal from an open receptacle, container or the like.

Located exteriorly of the body 12 is an adjustable band 28' the same being of a split form and is joined at the ends confronting the split through an adjustable fastener 29. The band 28' snugly embraces the body 12 and under adjustment thereof is adapted to contact with the mouth edge of the receptacle or container to limit the insertion of such body within the mouth 10 of the receptacle or container A, and when so inserted the band will contact with the mouth edge 11 to become seated thereon for holding the strainer in place in the mouth of such receptacle or container for use.

Normally the float or buoyant element 21 is in lowered position, so that the opening 14 is unobstructed, so that when liquid is poured into the receptacle or container through the body 12 the said liquid will be strained, and when filling the said receptacle or container the float or buoyant element will rise according to the level of the liquid and when it reaches a determined height the opening 14 will be automatically closed to shut off further supply or flow of liquid into the receptacle or container. In this manner the possibility of the overflow of the receptacle or container A will be reduced to a minimum.

It should be obvious that by adjustment of the band 28 the level of the liquid in the receptacle or container can be determined, the strainer being automatic in its operation for self-closing action. Thus it should be apparent that there is less liability of an overflow of the contents when filling a receptacle or container and avoidance of waste. The strainer in its construction is adaptable more especially to milk cans for the filling of the same with milk.

It should be apparent that by the arrangement of the filtering fabric below the screen or strainer a double action takes place on the liquid as the latter first becomes screened and then filtered.

The guide rods 24 are of such length that the opening of the stopper 23 will not be greater than to take care of the amount of liquid passing the filtering fabric and the reason for this is that it will prevent the amount of liquid or its weight resting totally on the filtering fabric and a slow discharge. The filtering fabric is backed so as to enable a perfect filtering action.

What is claimed is:

A strainer of the kind described comprising a cylindrical body for fitting within a container or receptacle at the mouth thereof and having a horizontal partition intermediate of its ends, said partition being formed with a central opening, an annular flange about said opening and forming a stopper seat, an annular rib rising from the partition concentrically of said flange, a strainer removably fitted with the rib, vertical tubular guides interiorly of the body above the partition at diametrically opposite sides of said body, an inverted substantially cup-shaped float beneath the partition and movable in the body, a resilient stopper carried centrally of the float and engageable with the seat formed by the flange on the partition, upstanding guide rods on the float at diametrically opposite sides thereof and slidably fitted in the tubular guides, a handle bridging the upper end of the cylindrical body and loosely engaged with the guide rods, and winged nuts fitted with the upper ends of said guide rods and forming abutments for said handle.

OTTO MUENSTER.